(12) United States Patent
Fox

(10) Patent No.: US 7,410,442 B2
(45) Date of Patent: Aug. 12, 2008

(54) TRANSMISSION CONTAINING HELICAL GEARING AND BEARING ARRANGEMENT THEREFOR

(75) Inventor: Gerald P. Fox, Massillon, OH (US)

(73) Assignee: The Timken Company, Canton, OH (US)

(*) Notice: Subject to any disclaimer, the term of this patent is extended or adjusted under 35 U.S.C. 154(b) by 347 days.

(21) Appl. No.: 10/561,032

(22) PCT Filed: Jun. 30, 2004

(86) PCT No.: PCT/US2004/021265

§ 371 (c)(1),
(2), (4) Date: Dec. 16, 2005

(87) PCT Pub. No.: WO2005/005866

PCT Pub. Date: Jan. 20, 2005

(65) Prior Publication Data

US 2007/0099745 A1 May 3, 2007

Related U.S. Application Data

(60) Provisional application No. 60/484,578, filed on Jul. 2, 2003.

(51) Int. Cl.
*F16H 57/08* (2006.01)
*F16H 37/06* (2006.01)
*A47C 7/74* (2006.01)

(52) U.S. Cl. ............... 475/343; 74/665 GD; 416/170 R

(58) Field of Classification Search ............. 475/343, 475/207; 74/412 R, 413, 414, 665 GD; 290/44, 290/55; 416/170 R; 384/571
See application file for complete search history.

(56) References Cited

U.S. PATENT DOCUMENTS 3,397,020 A 8/1968 Edwards (Continued)

FOREIGN PATENT DOCUMENTS

DE 4438500 A 5/1996

(Continued)

OTHER PUBLICATIONS

PCT/US04/21265—Notification of Transmittal of International Preliminary Examination Report (1 page).

(Continued)

*Primary Examiner*—Roger Pang
(74) *Attorney, Agent, or Firm*—Polster, Lieder, Woodruff & Lucchesi, L.C.

(57) ABSTRACT

A transmission for a wind turbine includes a housing (20) in which two shafts (26, 28) rotate, each being supported on a locating bearing (50, 60) which transmits thrust loads to the housing as well as radial loads and on a nonlocating bearing (48, 58) which transmits only radial loads to the housing. The shafts carry helical gears (52, 52, 62) which induce thrust loads in the shafts when the shafts transmit torque. The locating bearings are unitized single row tapered roller bearings which are oriented to transmit thrust loads in the primary direction through their raceways (132, 138) and in the secondary direction through ribs (134, 144) at the ends of their rollers (146). The nonlocating bearings take the form of a single row cylindrical roller bearings which accommodate differential thermal expansion and contraction between the shafts and housing.

17 Claims, 4 Drawing Sheets

U.S. PATENT DOCUMENTS

| | | | |
|---|---|---|---|
| 3,420,589 A | | 1/1969 | Green et al. |
| 3,689,127 A | | 9/1972 | Hampp et al. |
| 4,136,916 A | | 1/1979 | Musselman et al. |
| 5,009,523 A | * | 4/1991 | Folger et al. ............... 384/475 |
| 5,735,612 A | * | 4/1998 | Fox et al. ................... 384/448 |
| 6,420,808 B1 | * | 7/2002 | Hosle ......................... 310/83 |
| 6,544,140 B2 | * | 4/2003 | Gradu et al. ................ 475/246 |
| 6,658,955 B1 | * | 12/2003 | Fuhrer et al. ................. 74/413 |
| 6,695,738 B2 | * | 2/2004 | Sullivan et al. ............. 475/222 |
| 7,008,348 B2 | * | 3/2006 | LaBath ....................... 475/338 |
| 7,127,967 B2 | * | 10/2006 | Cook et al. ............. 74/665 GC |

FOREIGN PATENT DOCUMENTS

| | | | | |
|---|---|---|---|---|
| EP | 1227255 A | | 7/2002 | |
| JP | 360129453 A | * | 7/1985 | ................. 74/413 |
| JP | 10096463 | | 4/1998 | |

OTHER PUBLICATIONS

PCT/US04/21265—International Preliminary Examination Report (5 pages).

"Tapered Roller Bearings—Single Row" Internet Article, Anonymous, Feb. 19, 2003, whole document.

"Lagerungen Der Wellen und Zahraeder in Stirnradgetrieben", Schiemann, S. Krausskopf Verlag fur Wirtschaft GMBH. Mainz, DE, vol. 32, No. 7 Jul. 7, 1993 pp. 34, 36-39, the whole document.

* cited by examiner

TRANSMISSION CONTAINING HELICAL GEARING AND BEARING ARRANGEMENT THEREFOR

RELATED APPLICATION

This application derives and claims priority from International Application PCT/US2004/021265, filed Jun. 30, 2004, and published under International Publication Number WO 2005/005866 A1, and from U.S. provisional application 60/484,578, filed Jul. 2, 2003.

TECHNICAL FIELD

This invention relates in general to transmissions and more particularly to transmissions containing helical gears.

BACKGROUND ART

Wind turbines, which harness the wind to produce power, represent an ever-increasing source of electrical energy. Basically, the wind impinges against vanes on a rotor, causing the rotor to revolve, and the rotor powers an electrical generator. But the vanes need considerable length and surface area to capture the wind, and as a consequence they rotate at a relatively low angular velocity. The generator must operate at a high angular velocity if it is to remain relatively compact.

To satisfy these ends, the typical wind turbine includes a transmission between the rotor and the generator to step-up the speed of rotation. The gearing of the transmission includes a planetary set which the rotor drives, an intermediate shaft which the planetary set drives, and an output shaft which the intermediate shaft drives. The output shaft is connected to the generator. Wind turbines must operate at low sound levels, and to reduce the noise produced by the gearing on the higher speed intermediate and output shafts, the gears on those shafts are cut with helical teeth. Helical gears induce thrust loads which the bearings for the shafts must accommodate. Indeed, the bearings for each shaft must accommodate thrust loading in both axial directions as well as radial loading. In this regard, most of the time the rotor drives the generator and this produces thrust loads in each shaft in only one direction. However, during some service procedures, the generator is converted into a motor which produces thrust loads in each shaft in the opposite direction, although of a lesser magnitude.

Bearings at two positions usually support the intermediate shaft and also the output shaft. These bearings are organized in a locating-nonlocating configuration or a cross locating configuration.

In the locating-nonlocating configuration bearings at one position confine its shaft axially and further carries radial loads. At the other position a bearing merely takes radial loads. The nonlocating bearing, since it does not take thrust loads, accommodates thermal expansion and contraction between its shaft and the housing without inducing axial loads in any of the bearings. Typically the locating position includes (FIG. 1) a deep groove ball bearing used in conjunction with a single-row cylindrical roller bearing (NU style— radial loading only), although two-row spherical roller bearings and a two-row cylindrical roller bearings (NJ style— radial and axial loading) have also been used at this position. Deep groove ball bearings can experience unusual wear patterns and can fail prematurely along their raceways. Hence, transmissions containing these bearings are constructed such that the bearing and their shafts can be easily removed. Two-row bearings, moreover, consume considerable axial space where space is at a premium.

In the cross locating configuration, the bearings at both positions accommodate the axial loads, with one taking the gear thrust in the primary direction, that is when the rotor drives the generator, and the other taking gear thrust in the secondary direction, which the generator serves as a motor to drive the rotor. Typical of these bearings are single row tapered roller bearings mounted in opposition. Sometimes two cylindrical rollers bearings, each ribbed on both of its races to take thrust loads (NJ style), are used. Either of these cross-locating designs must be carefully adjusted at assembly to insure that the proper radial and axial clearances are present in the bearings and bearing system. These clearances are critical in terms of controlling the load zones in the bearings, the heat generation of the system, and the final position of the gear contacts under the operating loads and temperatures. Although adjustment of these clearances is a common and well-acknowledged practice in the transmission industry, the concern always remains in this industry over manufacturing errors or operator error during adjustment, altering the expected settings and subsequently affecting the performance of the transmission (high temperatures, poor gear contact, noise vibration, etc).

BEST MODE FOR CARRYING OUT THE INVENTION

Figure 1:
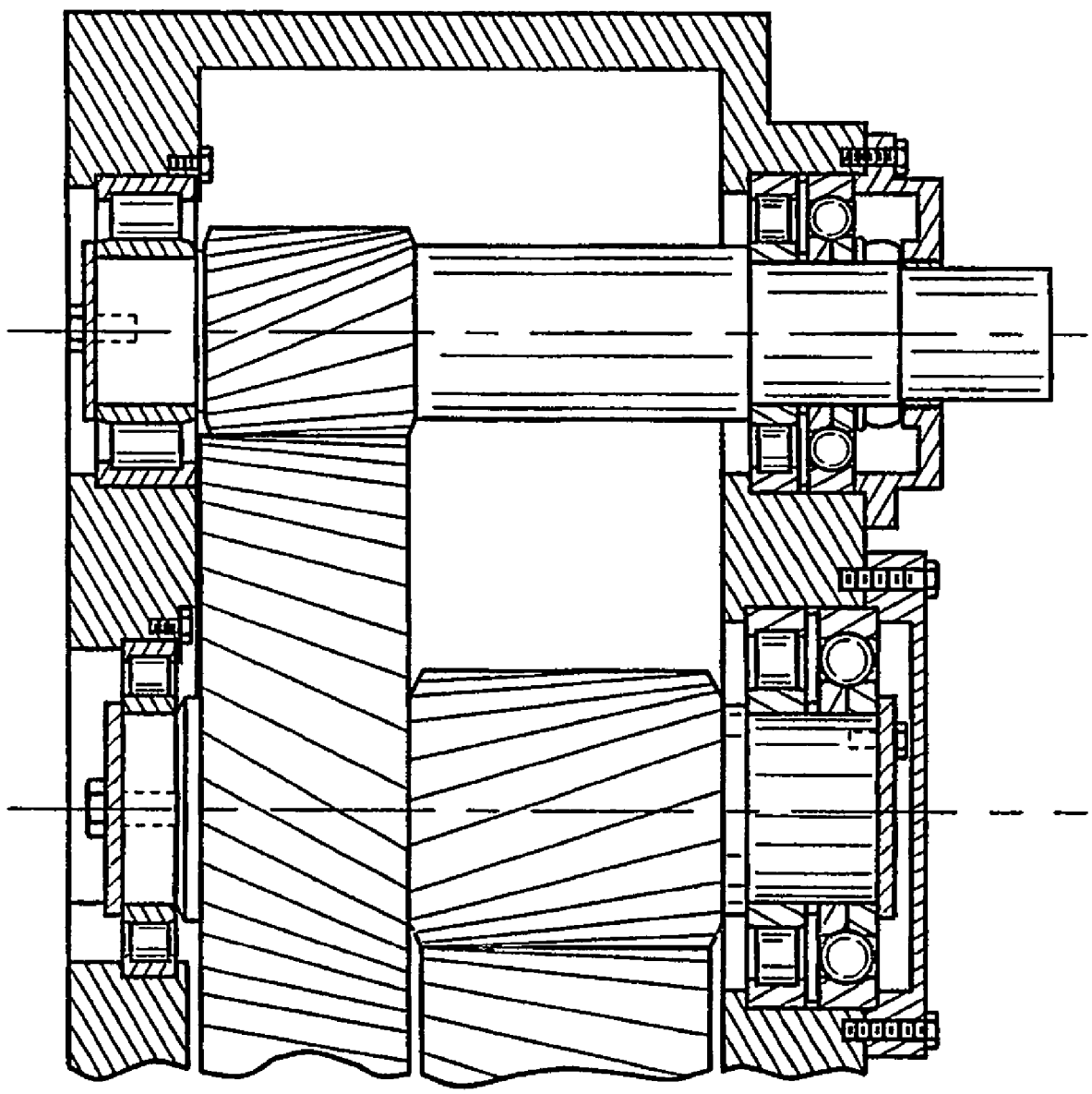
FIG. 1 is a fragmentary sectional view of a wind turbine transmission representing the prior art.
Figure 2:
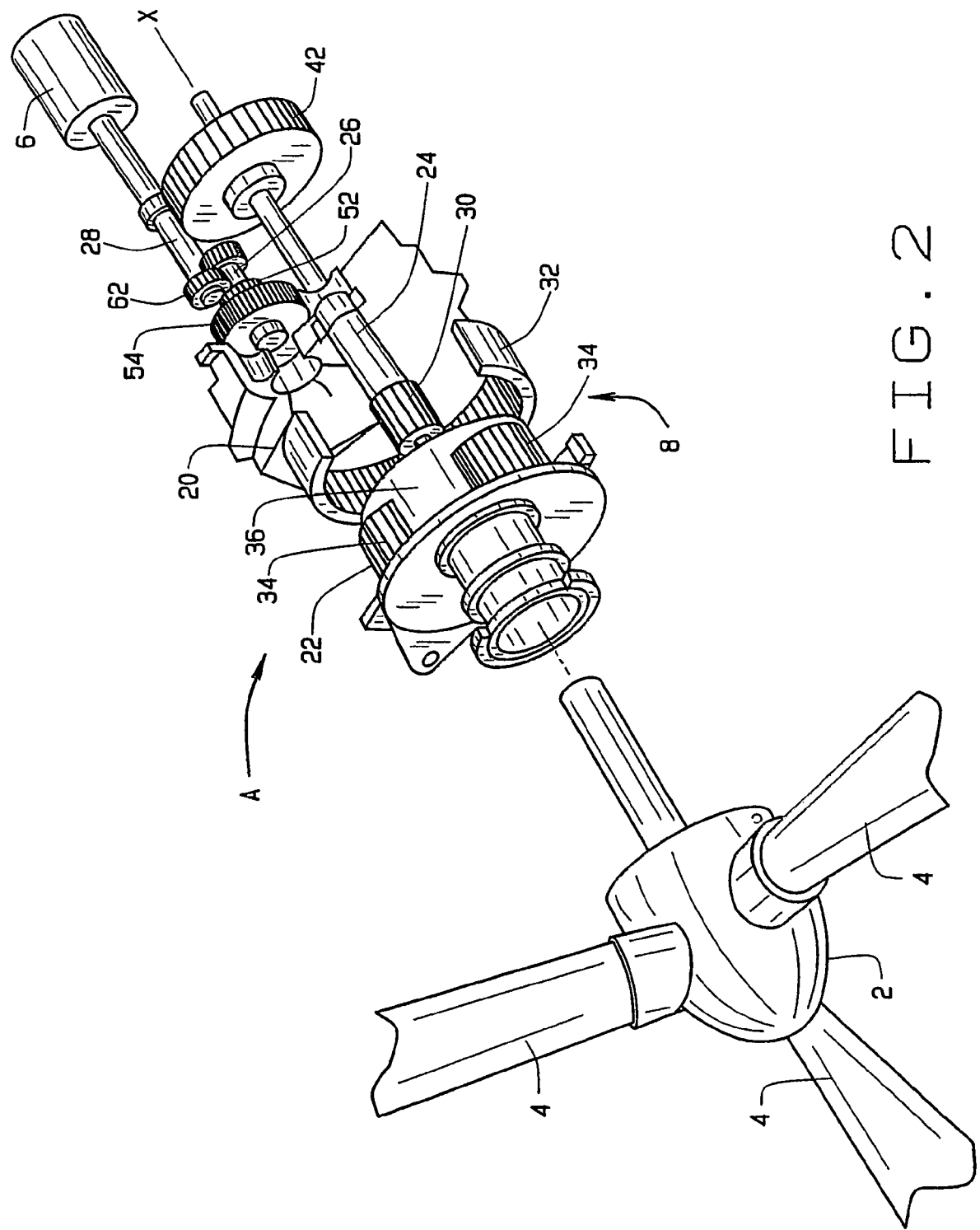
FIG. 2 is an exploded view of a modular-style wind turbine having a transmission located between a rotor and a generator.

Referring now to the drawings, a wind turbine A (FIG. 2) for generating electrical energy includes a rotor 2 provided with vanes 4 against which the wind impinges to cause the rotor 2 to revolve about an axis X. The rotor 2 drives a generator 6 which produces electrical energy. But the rotor 2 is not coupled directly to the generator 4. Instead, the two are connected through a transmission 8 which effects a step-up in speed, so that the generator 4 rotates at an angular velocity considerably greater than the rotor 2.

The transmission 8 includes housing 20 and within the housing 20 a planetary set 22, a drive or sun shaft 24, an intermediate shaft 26, and an output shaft 28. The rotor 2 is coupled to the planetary set 22, whereas the generator 4 is coupled to the output shaft 28.

The planetary gear set has a sun gear 30, a ring gear 32, and planet gears 34 located between and engaged with the sun and ring gears 30 and 32. It also has a carrier 36 on which the planet gears 34 rotate. The sun gear 30 is coupled to the sun shaft 24, and both rotate about the axis X, which is the axis of rotation for the rotor 2. The ring gear 32 remains fixed in position within the housing 20. The carrier 36 is coupled to rotor 2. Thus, the rotor 2 rotates the carrier 36 at the angular velocity imparted to the rotor 2 by the vanes 4, and the carrier 36 causes the planet gears 34 to orbit between the sun gear 30 and ring gear 32. Since the ring gear 32 is fixed in position within the housing 20, the planet gears 34 rotate the sun gear 32 at an angular velocity exceeding that of the rotor 2. International patent applications PCT/US02/20069 (WO 03/002891 A1) and PCT/US04/002157 disclose planetary sets suitable for use as the planetary set 22.

The sun shaft 24 is supported in the housing 20 on bearings 40 which enable the shaft 24 to rotate about the axis X with the sun gear 30 to which it is connected. The bearings 40 accommodate both radial and axial loads. The shaft 24 carries a bull gear 42 having helical teeth.

Figure 3:
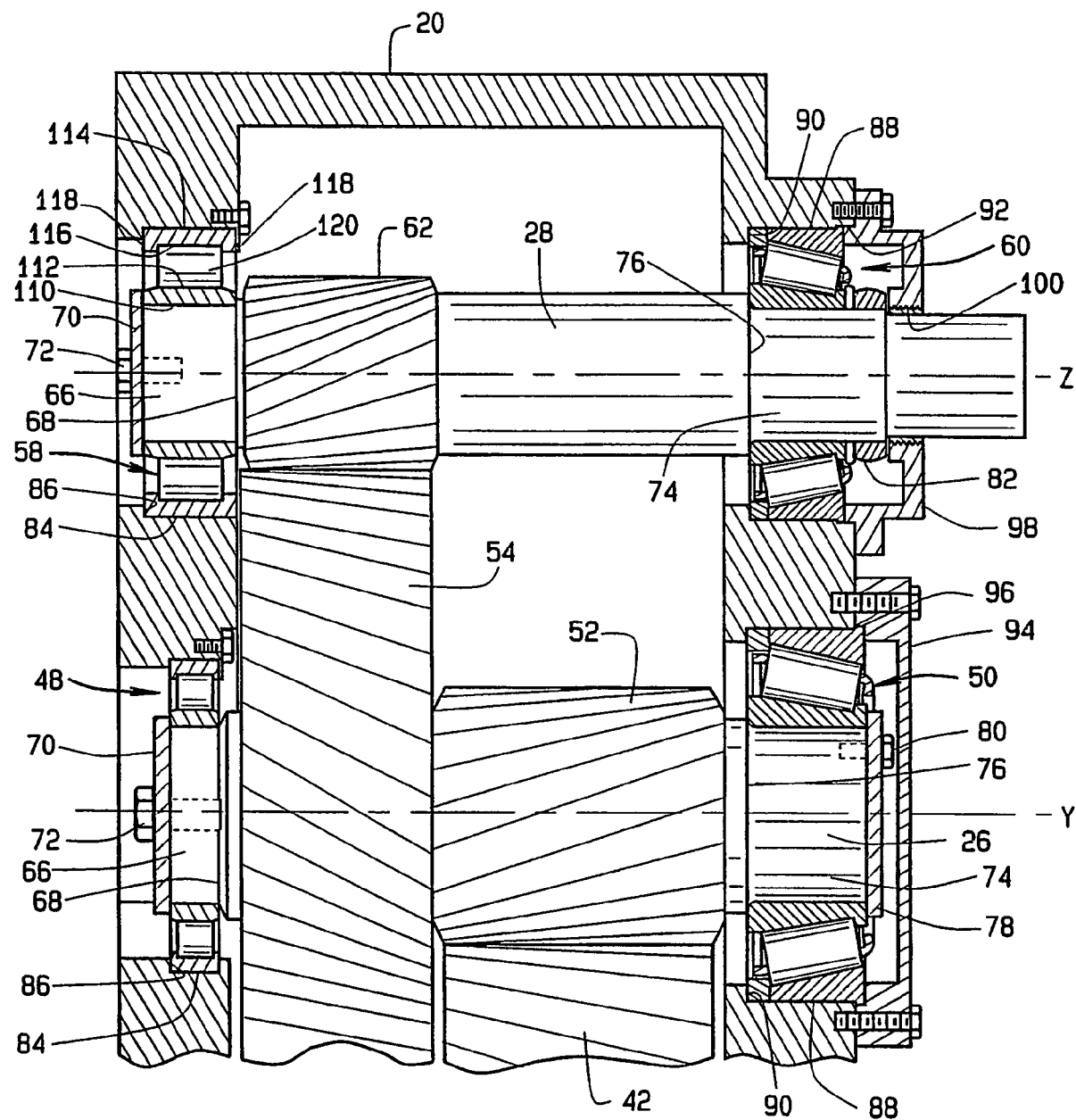
FIG. 3 is a fragmentary sectional view of a transmission forming part of and embodying the present invention.

The intermediate shaft 26 is supported (FIG. 3) in the housing 20 on a single row cylindrical roller bearing 48 and a unitized single row tapered roller bearing 50. They enable the shaft 26 to rotate about an axis Y that lies parallel to the axis X. The former takes only radial loads, but will accommodate axial displacement of the shaft 26 relative to the housing 20. It thus constitutes a nonlocating bearing. The latter takes radial loads as well as axial loads in both axial directions. It serves as a locating bearing. The intermediate shaft 26 carries a pinion 52 which meshes with the bull gear 42 on the sun shaft 24. It also carries a helical gear 54. Both the pinion 52 and the helical gear 54 are located between the two bearings 48 and 50, and both have helical teeth.

The output shaft 28 is also supported in the housing 20 at one end on a single row cylindrical roller bearings 58 and at its other end on a unitized single row tapered roller bearing 60, and they enable the shaft 28 to rotate about an axis Z that lies parallel to the axes X and Y. The cylindrical roller bearing 58 serves as a nonlocating bearing, whereas the tapered roller bearing 60 serves as a locating bearing. The shaft 28 carries a pinion 62, which is located between the two bearings 58 and 60 and meshes with the helical gear 54 on the intermediate shaft 26. It too has helical teeth.

Whereas the intermediate shaft 26 is confined essentially to the interior of the housing 20, the output shaft 28 at one of its ends projects out of the housing 20 and here is connected with the generator 6. In any event, each shaft 26 and 28 at one of its ends has a cylindrical bearing seat 66 that leads up to a shoulder 68 and across that end a backing plate 70 extends, it being secured with a cap screw 72 that threads into the shaft. The cylindrical roller bearings 48 and 58 fit around the seats 66 on the two shafts 26 and 28, respectively.

Each shaft 26 and 28 at its opposite end has (FIG. 3) another cylindrical bearing seat 74 and a shoulder 76 to which the seat 74 leads. The unitized tapered roller bearings 50 and 60 fit around the seats 74 on the shafts 26 and 28, respectively. The intermediate shaft 26 terminates at the end of its bearing seat 74, and here another backing plate 78 is attached to the shaft 26 with cap screws 80. The seat 74 on the output shaft 28 extends somewhat beyond the unitized tapered roller bearing 60 for that shaft 28, and here it is clamped against the shoulder 76 with a clamping nut 82 that threads over the shaft 28.

The housing 20 contains (FIG. 3) a bearing seat 84 for each of the cylindrical roller bearings 48 and 58, with each seat 84 at one of its ends terminating at a shoulder 86 and at its opposite end opening into the interior of the housing 20. The housing 20 also has a seat 88 for each of the two unitized tapered roller bearings 50 and 60, and those seats 88 align along the axes Y and Z with the seats 84 for the cylindrical roller bearings 48 and 58. Each seat 88 at one of its ends terminates at a shoulder 90 in the housing 20 and at its opposite end opens out of the housing 20 away from the interior of the housing 20. Actually, the seat 88 for the bearing 60 opens into a counterbore 92 which in turn opens out of the housing 20. Fastened to the housing 20 over the end of the seat 88 for the bearing 50 is an end cap 94 having a rabbet 96 that faces that seat 90. At the seat 74 for the other bearing 60 that supports the output shaft 28 the housing 20 is fitted with a retaining ring 98 which in one axial direction projects slightly into the counterbore 92 and in the other axial direction is configured to provide a labyrinth 100 which encircles the output shaft 28 where it projects from the housing 20.

The two cylindrical roller bearings 48 and 58, owning to their inability to transfer thrust loads, constitute nonlocating bearings for their respective shafts 26 and 28. Each includes (FIG. 3) an inner race 110 having a cylindrical raceway 112 presented outwardly, with the raceway 112 forming the greatest diameter on the race 110. In addition, each bearing 48 and 58 has an outer race 114 that surrounds the inner race 110. The outer race 114 has a cylindrical raceway 116 that is presented inwardly toward the raceway 112 of the inner race 110. It also has two inwardly directed ribs 118 at the ends of the raceway 116, so that the raceway 116 lies between the ribs 118. Also, each bearing 48 and 58 has cylindrical rollers 120 located in a single row between the raceways 112 and 116, with little, if any clearance between the cylindrical side faces of the rollers 120 and the raceways 112 and 116. The rollers 120 may be separated with a cage to maintain them at uniformly spaced intervals between the two races 110 and 114.

Considering the bearing 48 specifically, its inner race 110 fits over the bearing seat 66 on the intermediate shaft 26 with an interference fit and here lies captured between the shoulder 68 and the backing plate 70. The outer race 114 fits into the surrounding bearing seat 84 in the housing 20 with an interference fit, its one end being against the shoulder 86 at the end of the seat 84. A retaining device, such as a snap ring or clamping ring, that is fitted to the housing 20 insures that the outer race 114 of the bearing 48 remains in its seat 84.

The other cylindrical roller bearing 58 is fitted to the output shaft 28 and to the housing 20 in a like manner. Its inner race 110 fits over the bearing seat 66 between the shoulder 68 and the backing plate 70 on the shaft 28. Its outer race 114 fits into the bearing seat 84 that surrounds the end of the shaft 28, where the race 114 is against the shoulder 86 of that seat 84. Another retaining device insures that the outer race 114 of the bearing 58 remains in its seat 84.

Figure 4:
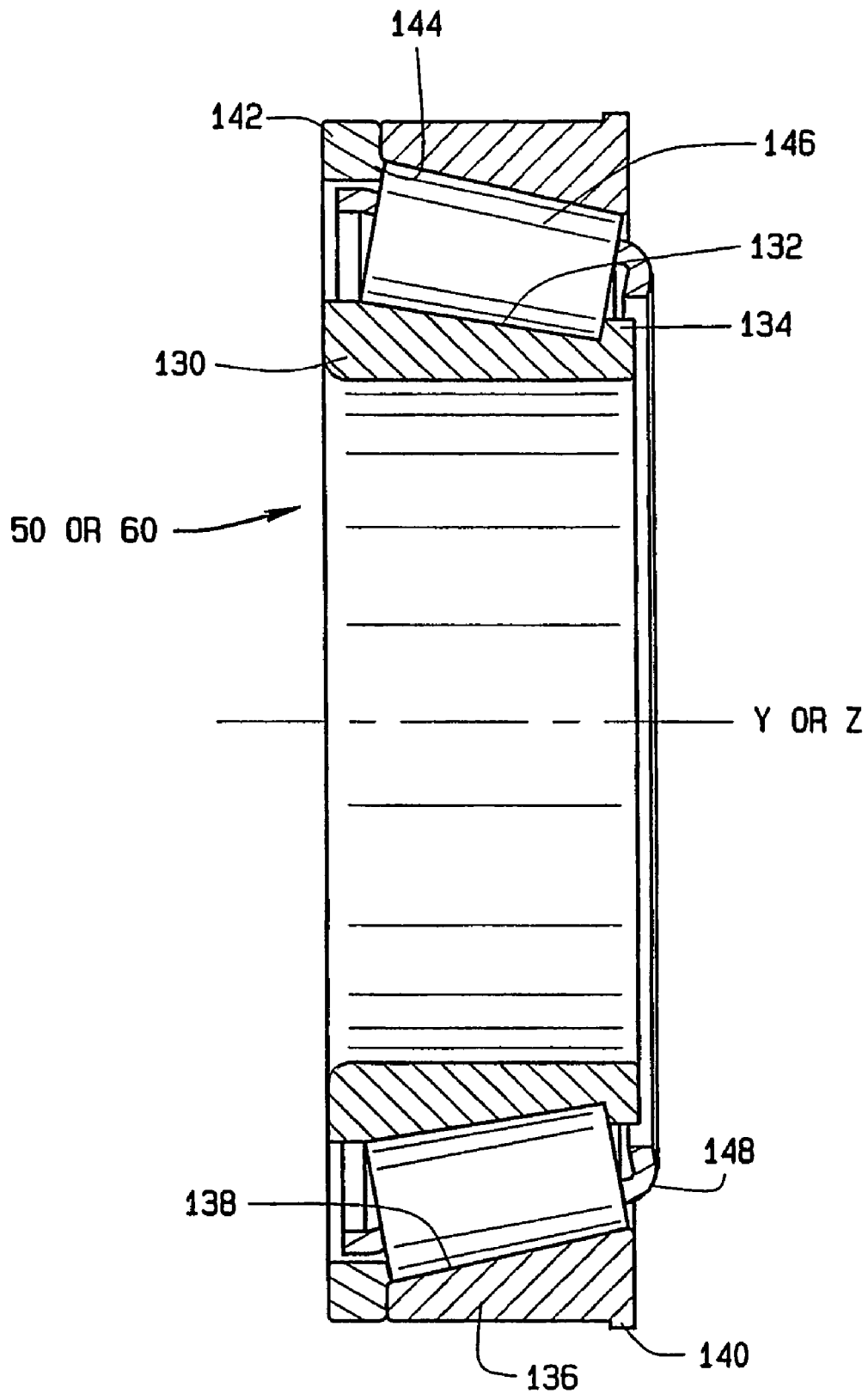
FIG. 4 is a sectional view of a locating bearing in the transmission of the present invention.

The two unitized tapered roller bearings 50 and 60 constitute locating bearings in that they take thrust loads in both axial directions and, of course, radial loads as well. Each includes (FIG. 4) an inner race in the form of a cone 130 having a tapered raceway 132 that is presented outwardly and a rib 134 which projects outwardly beyond the small end of the raceway 132. Each bearing 50 and 60 also has an outer race in the form of a cup 136 having a tapered raceway 138 that is presented inwardly and tapers in the same direction as the tapered raceway 132 on the cone 130. The cup 136 also has a small flange 140 that projects outwardly at its end where the raceway 138 is smallest. At its other end the cup 136 is fitted with a rib ring 142 having a rib 144 that lies along and projects inwardly from the large end of the raceway 138. In addition to the cone 130, cup 136, and rib ring 142, each bearing 50 and 60 has tapered rollers 146 arranged in a single row between the raceways 132 and 138 of the cone 130 and cup 136, respectively, and likewise between the rib 134 of the cone 130 and the rib ring 142 at the end of the cup 136. The rollers 146 are on apex, meaning that the conical envelopes in which their side faces lie have their apices at a common point along the bearing Y or Z, and likewise the conical envelopes in which the raceways 132 and 138 lie have their apices at the same point. A radial load transferred through either bearing 50 or 60, owing to its tapered geometry, will urge the rollers 146 up the raceways 132 and 138, but the large ends of the rollers 146 bear against the rib 144 on the rib ring 142, so the rib ring 142 prevents the rollers 146 from being expelled from the space between the raceways 132 and 138. When the rollers 146 are so positioned, a small clearance exists between the small end faces of the rollers 146 and the rib 134 on the cone 130 The rollers 146 may be confined by a cage 148 to maintain uniform spacing between them.

The configuration of the locating bearings 50 and 60 is such that they carry radial loads and thrust or axial loads as well-indeed, in both axial directions. In one axial direction the thrust loads are transferred through the raceways 132 and 138 and generally radially through the rollers 146. In the other axial direction they are transferred through the ribs 134 and 144 and generally longitudinally through the rollers 146.

Turning now to the tapered roller bearing 50 specifically, its cone 130 fits (FIG. 3) over the bearing seat 74 on the intermediate shaft 26 with an interference fit and with its end where the raceway 132 is largest against the shoulder 76. Here the cone 130 is captured between the shoulder 76 and the backing plate 78. The cup 136 and rib ring 142 fit into surrounding bearing seat 88 in the housing 20 with an interference fit and with the rib ring 142 at the end of the cup 136 bearing 50 against the shoulder 90 at the end of the seat 88. The flange 140 locates outside the seat 88 and projects into the rabbet 76 in the end cap 94. This insures that the bearing 50 can assume only one orientation in the housing 20 and around the shaft 26. Both the cup 136 and rib ring 142 are captured in the seat 88 between the shoulder 90 and the end cap 94.

The other unitized tapered roller bearing 60 supports the output shaft 28 in the housing 20 in a like manner. Its cone 130 fits over the bearing seat 74 on the shaft 28 with an interference fit, its end where the raceway 132 is largest being against the shoulder 76. The clamping nut 82 is threaded over the shaft 28 behind the cone 130, so the cone 130 lies captured between the shoulder 76 at the end of the seat 74 and the nut 82. The cup 136 and rib ring 142 fit into the surrounding bearing seat 88 in the housing 20, with the rib ring 142 being against the shoulder 90 at the end of the seat 88. The flange 140 at the other end of the cup 136 locates in the counterbore 92. Indeed, the cup 136 and rib ring 142 are captured between the shoulder 90 and the retaining ring 98 which is attached to the housing 20. Again, the flange 140 insures that the bearing 60 is installed in the housing 20 and around the shaft 28 in the correct orientation.

Both of the unitized tapered roller bearings 50 and 60 have the large ends of their tapered rollers 146—and likewise the large ends of their tapered raceways 132 and 138—presented inwardly toward the interior of the housing 20 and toward their corresponding cylindrical roller bearing 48 and 58, respectively. Should the shafts 26 and 28 experience thrusts which urge those shafts 26 and 28 towards their bearings 50 and 60, the bearings 50 and 60 will transfer the thrust loads to the housing 20 which will resist it. Indeed, the thrust loads will pass generally radially through the rollers 146 at the raceways 132 and 138 on the cones 130 and cups 136, respectively. Should the shafts 26 and 28 experience thrust loading in the opposite axial direction, the bearings 50 and 60 will likewise transfer the thrust loading to the housing 20 which will resist it. In this instance the thrust loading passes generally longitudinally through the rollers 146 from the rib 134 on the cone 130 to the rib 144 on the rib ring 142.

The two cylindrical roller bearings 48 and 58 transfer radial loads between the shafts 26 and 28 and the housing 20, but do not have the capacity to transfer axial loads. This allows the shaft 26 to expand and contract with respect to the housing 20 without affecting either of its bearings 48 and 50 and likewise enables the shaft 28 to expand and contract without affecting its bearings 58 and 60. During differential thermal expansion and contraction the inner races 110 of the cylindrical roller bearings 48 and 58 merely slide within their rows of cylindrical rollers 102.

For the nonlocating bearings 48 and 58 and the locating bearings 50 and 60 engineered surface coatings may be applied to critical surfaces, should operating conditions become severe enough to cause concern about adhesion wear at those surfaces. Among the critical surfaces are the side faces of the cylindrical rollers 120 for the bearings 48 and 58, and the side faces and end faces for the tapered rollers 146 of the bearings 50 and 60. International patent application PCT/US03/09845 (WO 03/085,276 A2) and its counterpart U.S. Pat. No. 6,764,219 discloses tribological coatings which will suffice. They are incorporated herein by reference.

In the operation of the wind turbine A, wind impinging against the vanes 4 of the rotor 2, turns the rotor 2 which, in turn, rotates the carrier 36 of the planetary set 22. The sun gear 30 of the planetary set 22 revolves at a higher angular velocity, and it rotates the sun shaft 24 and the bull gear 42 on the shaft 24. The bull gear 42, being meshed with the pinion 52 on the intermediate shaft 26, rotates the pinion 52 and the intermediate shaft 26, and also the helical gear 54 on that shaft at a higher velocity than the sun shaft 24. Owing to the helical configuration of the teeth on the meshed bull gear 42 and pinion 52, the intermediate shaft 26 is thrust toward the tapered roller bearing 50 that supports that shaft. But the bearing 50 resists the thrust, transferring it to the housing 20 through its tapered raceways 132 and 138 and tapered rollers 146. In other words, the thrust imparted by the bull gear 42 is in the direction which seats the rollers 146 against the raceways 132 and 138. Radial loads on the intermediate shaft 26 transfer to the housing 20 through both of the bearings 48 and 50 that support the shaft 26.

The helical gear 54 of the intermediate shaft 26, being meshed with the pinion 62 on the output shaft 28, rotates the output shaft 28 at a still greater velocity. Again, the thrust imparted to the shaft 28 by reason of the helical configuration of the teeth on the gear 54 and pinion 62 is such that the shaft 28 is thrust toward the tapered roller bearing 60 for the shaft 28. The bearing 60 resists that thrust by transferring it to the housing 20 through its raceways 132 and 138 and rollers 146. In other words, the thrust operates in the direction that seats the tapered rollers 146 against the raceways 132 and 138 of the bearing 60. The tapered roller bearing 60 together with the cylindrical roller bearing 58 transfer radial loads between the output shaft 28 and the housing 20. The output shaft 28 rotates the generator 6 at the stepped-up velocity of the shaft 28, and the generator 6 of course produces electrical energy.

Thus, when the wind turbine A operates in its power-generating mode, the thrust induced in the two shafts 26 and 28 is transferred to the housing 20 at the two locating bearings 50 and 60, respectively, and is resisted at the housing 20, with the thrust transferring through the bearings 50 and 60 at their tapered raceways 132 and 138 and radially through their tapered rollers 146. The angle of the raceway 138 on the cup of each bearing 50 and 60 should be such that the load zone of the bearing remains 300° or greater. This insures that the rollers 146 are driven without skew, that the gear contacts are maintained near center, and that the bearing life is maximized.

To be sure, the pinion 62 exerts thrust on the helical gear 54 in the direction opposite to that which seats the rollers 146 of the locating bearing 50 against the raceways 132 and 138 of that bearing, but the magnitude of that thrust is less than the thrust exerted on the pinion 52 by the bull gear 42. The resultant thrust urges the intermediate shaft 26 toward its tapered roller bearing 50.

Even though the cylindrical roller bearings 48 and 58 do not transfer any thrust loads to the housing 20, they do transfer radial loads. Moreover, they allow the two shafts 26 and 28 to expand and contract axially relative to the housing 20.

Sometimes it may become necessary to convert the generator 6 into a motor in order to have it drive the rotor 2, this being for maintenance procedures or perhaps cutting the generator 6 into an electrical grid. When this occurs, the output shaft 28 and the intermediate shaft 26 are thrust in the opposite direction, that is toward their respective cylindrical roller bearings 48 and 58. But the bearing 48 and 58 transfer none of this thrust to the housing 20. Instead the transfer of thrust to the housing 20 again occurs at the unitized tapered roller bearings 50 and 60. With the thrusts tending to unseat the tapered rollers 146 from their raceways 132 and 138, the thrust transfers generally longitudinally through the rollers 146, it being transferred at the ribs 134 on the cones 130 and the rib 144 on the rib rings 142.

In the motor mode, where the generator 6 drives the components of the transmission 8 and the rotor 2, the loading is usually less since all that is being driven is the combined inertia of the drive train and rotor 2 through a very large reduction. The static thrust capacity on the raceways 132 and 138 and ribs 134 and 144 should be at least 3.0 times the load applied at 100% of the maximum operational load. Also, during peak-state loads that occur at the ends of braking cycles, it is desirable to limit the minimum static contact stress on the ribs 134 and 144 to 1000 megapascals.

Variations are possible. For example, the teeth on the gears 42, 52, 54 and 62 may be cut such that the shafts 26 and 28 experience thrust in opposite directions, in which event the locating bearings 50 and 60 should be oriented oppositely, so that they transfer the primary thrust of the power-generating mode such that the thrust seats the rollers 146 against the raceways 132 and 138. Also, the inner races 110 of the non-locating bearings 48 and 58 may be formed integral with their respective shafts 26 and 28, in which event the inner raceways 112 are directly on the shafts 26 and 28.

The invention claimed is:

1. In a wind turbine having a wind-driven rotor and an electrical generator, a transmission located between the rotor and the generator for transferring power between them, said transmission comprising:
    a housing;
    a shaft in the housing;
    a helical gear on the shaft and meshing with another helical gear such that torque applied to the gears imparts a thrust load to the shaft, with the direction of the thrust depending on the direction of rotation, one direction of rotation normally resulting in a greater thrust than the other direction of rotation;
    a first bearing supporting the shaft in the housing and being capable of transferring radial loads between the shaft and the housing;
    a second bearing supporting the shaft in the housing and being capable of transferring both radial loads and thrust loads in both axial directions between the shaft and the housing, the second bearing including:
        a cone located around the shaft and having a tapered raceway presented outwardly away from the shaft;
        a cup located in the housing and having a tapered raceway presented inwardly toward the raceway on the cone;
        a small rib at the small end of the tapered raceway on the cone;
        a large rib at the large end of the tapered raceway on the cup; and
        tapered rollers located in a single row between the raceways and between the ribs and having their tapered side faces against the raceways and their large and small end faces along the large and small ribs, respectively;
    whereby thrust loads in one direction are applied to the rollers at the raceways and in the other direction are applied to the rollers at the ribs, the bearing being oriented such that the normally greater thrust loads are applied to the rollers at the raceways.

2. A transmission according to claim 1 wherein the first bearing includes:
    an inner race on the shaft and having an outwardly presented cylindrical raceway;
    an outer race in the housing and having an inwardly presented cylindrical raceway presented toward the raceway of the inner race;
    cylindrical rollers located between the raceways of the inner and outer races and being capable of sliding axially on at least one of the raceways.

3. A transmission according to claim 2 wherein one of the races of the first bearing has ribs between which the rollers are located.

4. A transmission according to claim 1 wherein the small rib is formed integral with the cone of the second bearing and the large rib as formed separately from the cup of the second bearing.

5. A transmission according to claim 1 and further comprising:
    a second shaft on which another helical gear is carried, with that helical gear meshing with the helical gear that is carried by the shaft that is supported on the first and second bearings.
    a third bearing supporting the second shaft in the housing and being capable of transferring radial loads between the shaft and the housing;
    a fourth bearing supporting the second shaft in the housing and being capable of transferring both radial loads and thrust loads in both axial directions between the shaft and the housing, the fourth bearing including:
        a cone located around the second shaft and having a tapered raceway presented outwardly away from the second shaft;
        a cup located in the housing and having a tapered raceway presented inwardly toward the raceway on the cone;
        a small rib at the small end of the tapered raceway on the cone;
        a large rib at the large end of the tapered raceway on the cup; and
        tapered rollers located in a single row between the raceways and between the ribs, and having side faces against the raceways and large and small end faces along the large and small ribs, respectively.

6. A transmission according to claim 5 wherein the third bearing includes:
    an inner race on the second shaft and having an outwardly presented cylindrical raceway;
    an outer race in the housing and having an inwardly presented cylindrical raceway presented toward the raceway of the inner race;
    cylindrical rollers located between the raceways of the inner and outer races and being capable of sliding axially on at least one of the raceways.

7. A transmission according to claim 6 wherein one of the races of the third bearing has ribs between which the cylindrical rollers are located.

8. A transmission according to claim 5 wherein the small rib of the fourth bearing is formed integral with the cone of the fourth bearing and the large rib of the fourth bearing is formed separately from the cup of the fourth bearing.

9. A transmission according to claim 1 wherein the housing has a bearing seat in which the cup of the second bearing is received, and the cup at one of its ends has a flange which is too large to be received in the seat for the cup, whereby the cup will fit into the seat in only one orientation.

10. A transmission for a wind turbine having a rotor and a generator, said transmission comprising:
    a housing;
    a planetary set in the housing and being connected to the rotor;
    a drive shaft also connected to the planetary set such that it rotates at an angular velocity greater than the velocity of the rotor;
    a helical bull gear on the drive shaft;
    an intermediate shaft in the housing;
    locating and nonlocating antifriction bearings supporting the intermediate shaft in the housing;
    a helical gear and a helical pinion carried by the intermediate shaft, with the pinion meshing with the bull gear;
    an output shaft in the housing and being connected to the generator;
    locating and nonlocating antifriction bearings supporting the output shaft in the housing; and
    a pinion carried by the output shaft and meshing with the helical gear on the intermediate shaft;
    wherein the nonlocating bearings transfer only radial loads between their shafts and the housing;
    wherein the locating bearings transfer radial loads and thrust loads in both axial directions between their shafts and the housing, with each shaft normally experiencing thrust in one direction of a magnitude greater than in the other direction, each locating bearing comprising:
        a cone on the shaft supported by the bearing and having a tapered raceway that is presented away from the shaft;
        a cup in the housing and having a tapered raceway that is presented toward the raceway on the cone,
        a small rib at the small end of the raceway on the cone;
        a large rib at the large end of the raceway on the cup;
        tapered rollers arranged in a single row between the raceways on the cone and cup and between the ribs, with the tapered side faces of the rollers being against the raceways and the small and large end faces of the rollers being along the small and large ribs, respectively, whereby each locating bearing can transfer thrust in both axial directions; and
    wherein the locating bearings are oriented such that the greatest thrust loads are transferred through the rollers at the raceways of the bearings.

11. A transmission according to claim 10 wherein each nonlocating bearing comprises:
    an inner race located around the shaft supported by the bearing and having a cylindrical raceway that is presented outwardly away from the shaft;
    an outer race located in the housing and having a cylindrical raceway presented inwardly toward the raceway on the inner race, cylindrical rollers located between the raceways of the races; and
    ribs on one of the races for maintaining the rollers along the raceways.

12. A transmission according to claim 11 wherein the ribs of each nonlocating bearing are on the outer race of the bearing.

13. A transmission according to claim 10 wherein the housing has bearing seats in which the cups of the locating bearings are received, and each cup at one end has a flange which is too large to be received in the seat for the cup, whereby the cup will fit into the seat in only one orientation.

14. A transmission for wind turbine having a rotor and a generator, said transmission comprising:
    a housing;
    a drive shaft in the housing where it rotates at an angular velocity greater than the velocity of the rotor;
    a helical bull gear on the drive shaft;
    an intermediate shaft in the housing;
    locating and nonlocating antifriction bearings supporting the intermediate shaft in the housing;
    a helical gear and a helical pinion carried by the intermediate shaft, with the pinion meshing with the bull gear;
    an output shaft in the housing and being connected to the generator;
    locating and nonlocating antifriction bearings supporting the output shaft in the housing; and
    a helical pinion carried by the output shaft and meshing with the helical gear on the intermediate shaft;
    wherein the nonlocating bearings transfer only radial loads between their shafts and the housing;
    wherein the locating bearings transfer radial loads and thrust loads in both axial directions between their shafts and the housing, with each shaft normally experiencing thrust in one direction of a magnitude greater than in the other direction, each locating bearing comprising:
        a cone on the shaft supported by the bearing and having a tapered raceway that is presented away from the shaft;
        a cup in the housing and having a tapered raceway that is presented toward the raceway on the cone;
        a small rib at the small end of the raceway on the cone;
        a large rib at the large end of the raceway on the cup;
        tapered rollers arranged in a single row between the raceways on the cone and cup and between the ribs, with the tapered side faces of the rollers being against the raceways and the small and large end faces of the rollers being along the small and large ribs, respectively, whereby each locating bearing can transfer thrust in both axial directions; and
    wherein the locating bearings are oriented such that the greatest thrust loads are transferred through the rollers at the raceways of the bearings.

15. A transmission according to claim 14 wherein each nonlocating bearing comprises:
    an inner race located around the shaft supported by the bearing and having a cylindrical raceway that is presented outwardly away from the shaft;
    an outer race located in the housing and having a cylindrical raceway presented inwardly toward the raceway on the inner race, cylindrical rollers located between the raceways of the races; and
    ribs on one of the races for maintaining the rollers along the raceways.

16. A transmission according to claim 11 wherein the ribs of each nonlocating bearing are on the outer race of the bearing.

17. A transmission according to claim 10 wherein the housing has bearing seats in which the cups of the locating bearings are received, and each cup at one end has a flange which is too large to be received in the seat for the cup, whereby the cup will fit into the seat in only one orientation.

* * * * *